(12) United States Patent
Tseng et al.

(10) Patent No.: US 11,614,327 B2
(45) Date of Patent: Mar. 28, 2023

(54) GYROSCOPE STRUCTURE

(71) Applicant: SENSORTEK TECHNOLOGY CORP., Jhubei (TW)

(72) Inventors: Shih-Hsiung Tseng, Jhubei (TW); Shih-Wei Lee, Jhubei (TW); Chao-Shiun Wang, Jhubei (TW)

(73) Assignee: Sensortek Technology Corp., Jhubei (TW)

( * ) Notice: Subject to any disclaimer, the term of this patent is extended or adjusted under 35 U.S.C. 154(b) by 0 days.

(21) Appl. No.: 17/383,893

(22) Filed: Jul. 23, 2021

(65) Prior Publication Data

US 2022/0026210 A1 Jan. 27, 2022

Related U.S. Application Data (60) Provisional application No. 63/055,343, filed on Jul. 23, 2020.

(51) Int. Cl.
*G01C 19/5663* (2012.01)
*G01C 19/5769* (2012.01)

(52) U.S. Cl.
CPC ..... *G01C 19/5663* (2013.01); *G01C 19/5769* (2013.01)

(58) Field of Classification Search
CPC .................................................. G01C 19/573
See application file for complete search history.

(56) References Cited

U.S. PATENT DOCUMENTS

| | | | |
|---|---|---|---|
| 6,301,963 | B1 | 10/2001 | Park |
| 7,677,099 | B2 | 3/2010 | Nasiri et al. |
| 10,480,942 | B2 | 11/2019 | Gattere et al. |
| 11,187,529 | B2 * | 11/2021 | Takizawa ........... G01C 19/5712 |
| 2011/0094302 | A1 * | 4/2011 | Schofield ............... G01C 19/56 73/504.12 |
| 2013/0068018 | A1 * | 3/2013 | Seeger ............... G01C 19/5762 73/504.12 |

(Continued)

FOREIGN PATENT DOCUMENTS

CN 103424110 A 12/2013

OTHER PUBLICATIONS

Office Action which was issued to Taiwanese counterpart application No. 11121208750 dated Dec. 6, 2022.

*Primary Examiner* — Paul M. West
*Assistant Examiner* — Mark A Shabman
(74) *Attorney, Agent, or Firm* — Rosenberg, Klein & Lee (57) ABSTRACT

The present invention provides a gyroscope structure. A frame disposed on a substrate, and a flexible element is correspondingly disposed a first, second, and third plate. The first plate has a second flexibility. The second plate is connected to the second plate, the second plate is connected to the third plate with a fourth flexible element, the second plate is provided with a first through-hole, and a rotating plate is pivotally connected in the first through-hole. The rotating plate is connected to a supporting column of the substrate by a fifth flexible part, and then a sensing element is provided on the substrate corresponding to the first, second, and third plates to sense the movement and movement of the plates. Rotating, in one embodiment, the first and third plates are provided with through-holes, and corresponding sensing elements and driving elements are provided.

14 Claims, 12 Drawing Sheets

(56) References Cited

U.S. PATENT DOCUMENTS

| | | | |
|---|---|---|---|
| 2013/0192365 A1* | 8/2013 | Zhuang | G01C 19/5733 |
| | | | 73/504.12 |
| 2013/0233048 A1* | 9/2013 | Anac | G01C 19/56 |
| | | | 73/1.77 |
| 2017/0261322 A1* | 9/2017 | Gattere | G01C 19/5712 |
| 2017/0284804 A1* | 10/2017 | Gattere | G01C 19/5747 |

* cited by examiner

GYROSCOPE STRUCTURE

FIELD OF THE INVENTION

This invention provides a gyroscope structure, particularly a vibrating gyroscope structure.

BACKGROUND OF THE INVENTION

The vibrating gyroscope uses the Coriolis force, which is generated while the vibrating gyroscope is driven to rotate by the mass block with high-frequency vibration, to detect the angular motion. The vibrating gyroscope mainly is a device making high-frequency vibration with the advantages of stable performance, simple structure and high reliability. The commonly known vibrating gyroscopes include the tuning fork vibrating gyroscopes, piezoelectric vibrating gyroscopes, capacitive vibrating gyroscopes and shell vibrating gyroscopes.

The commonly known capacitive vibrating gyroscopes mostly include at least four mass blocks (or plates). To make the mass block vibrate along two different direction (corresponding to three-axle detection), the commonly known technologies always design a complicated structure; for example, it designs an extra driving frame that makes the overall structure of vibrating gyroscope larger and requires bigger chip size, which requires extra space-occupying cost.

Due to the commonly known technical issue mentioned above, this invention provides a gyroscope structure that the frame is equipped above the substrate, using flexible elements to connect the first plate, second plate and third plate; the second plate is equipped with the through-hole, a rotating plate is pivotally connected in the through-hole; sensing elements are equipped corresponding to the plates on the substrate to detect the linear and angular moving of the plates. Moreover, the through-holes are set on the first plate and the third plate to correspond to equipping the corresponded sensing elements and driving elements; and use this structure to provide a volume-reduced gyroscope.

SUMMARY

The purpose of this invention is to provide a gyroscope structure, wherein the frame is equipped above the substrate; at the inner edge of the frame, the first plate, second plate and third plate are connected to three respective flexible elements; the second plate is equipped with the through-hole, and a rotating plate is pivotally connected in the through-hole; sensing elements are equipped corresponding to the plates on the substrate to detect the linear and angular moving of the plates. Moreover, the through-holes are set on the first plate and the third plate to correspond to equipping the corresponded sensing elements and driving elements; and use this structure to reduce the overall volume of the gyroscope and increase the available space in the device.

To reach the purpose and effort mentioned above, this invention has provided a gyroscope structure that contains: a substrate, a first plate, a second plate and a third plate; a frame is set on the substrate; a first outer edge of the first plate is connected to one end of a first flexible element and one end of a second flexible element, the other end of the first flexible element is set at an inner edge of the frame; the first plate is located corresponding to a first sensing element disposed on the substrate; a second outer edge of the second plate is connected to the other end of the second flexible element; the second outer edge of the second plate is connected to one end of a third flexible element and one end of a fourth flexible element, the other end of the third flexible element is set at the inner edge of the frame; the second plate is equipped with a first through-hole. A rotating plate is pivotally connected with both the inner edge of the first through-hole and the second flexible element parallelly. One inner side of the rotating plate is equipped with a third through-hole; one inner edge of the third through-hole is connected to one side of the fifth flexible element. An inner edge of the third through-hole is connected to one end of the fifth flexible element, the other end of the fifth flexible element is connected to a supporting column located on the subtract. The rotating plate is located corresponding to a second sensing element and a third sensing element disposed on the substrate; a third out edge of the third plate is connected to the other end of the fourth flexible element and one end of a sixth flexible element, the other end of the sixth flexible element is set at the inner edge of the frame; the third plate is located corresponding to a fourth sensing element disposed on the substrate. The first plate moves horizontally corresponding to the second plate, and it rotates in the axial direction corresponding to the first flexible element. The second plate rotates horizontally corresponding to both the second flexible element and the fourth flexible element, and it rotates in the axial direction corresponding to the third flexible element. The rotating plate rotates in the axial direction corresponding to the fifth flexible element. The third plate moves horizontally corresponding to the second plate, and it rotates in the axial direction corresponding to the sixth flexible element. By using this structure, it can downsize the size of the gyroscope.

DETAILED DESCRIPTION

To enable the Review Committee members to have a deeper realization and understanding of the features and functions of this invention, we hereby put the embodiment and detailed explanation in below:

This invention uses a gyroscope structure, which is to set a frame on a substrate; a first plate, a second plate and a third plate are connected to the frame with flexible elements. The first plate, second plate and third plate are connected by flexible elements. The second plate is pivotally connected to a rotating plate in a first through-hole. The rotating plate uses a fifth flexible element to connect with a supporting column in the substrate. By equipping the first, second, third, and fourth sensing elements on the substrate corresponding to the first plate, the second plate, the third plate and the rotating plate to sense the linear movement and rotation of these plates, and correspondingly setting the sensing elements and driving elements; and using this structure to solve the problem of too big volume causing extra costs in the commonly known gyroscope technology.

Figure 1:
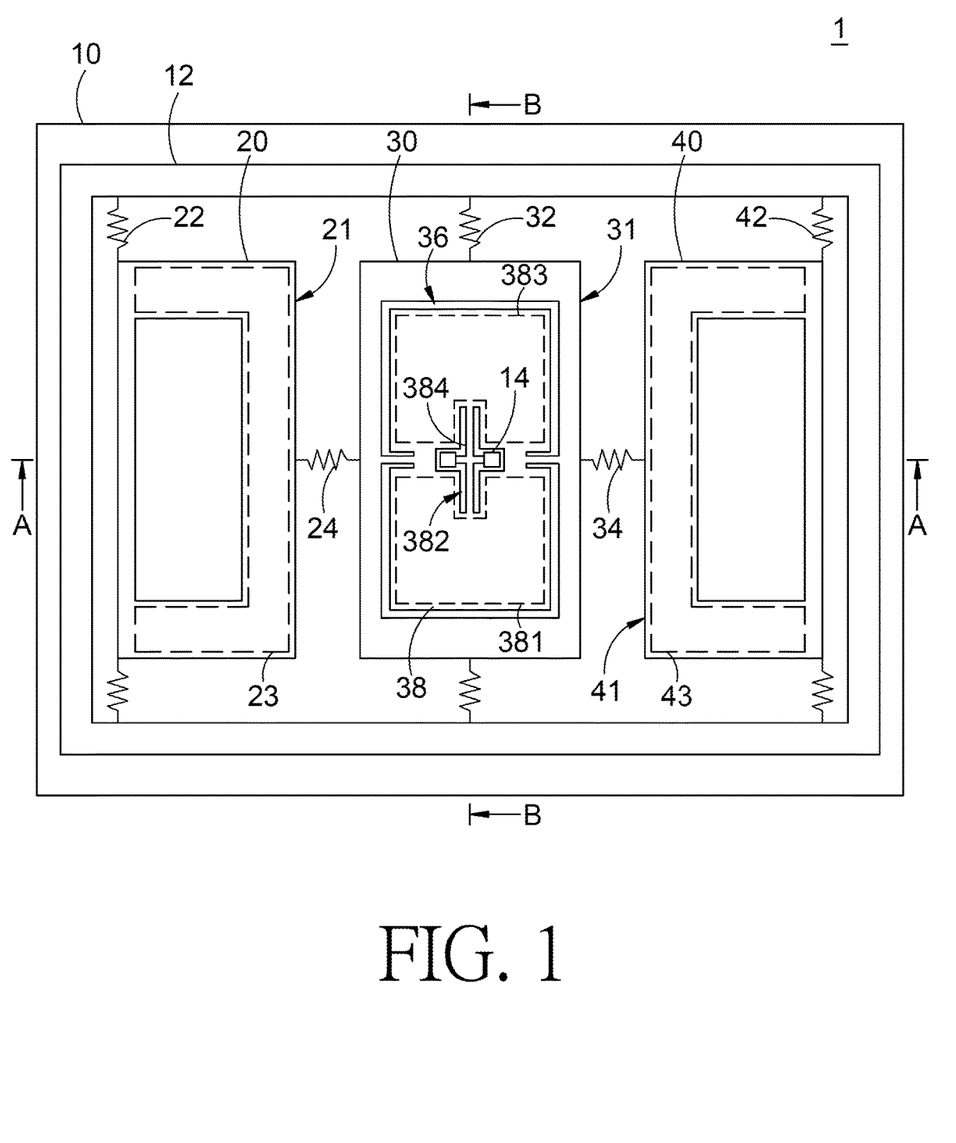
FIG. 1: The schematic diagram of structure in the first embodiment of this invention.

Refer to FIG. 1, which is the schematic diagram of structure in the first embodiment of this invention. As shown in FIG. 1, this embodiment is the first embodiment, which is the structure 1 of a gyroscope, including a substrate 10, a first plate 20, a second plate 30 and a third plate 40; here the substrate 10 can be a circuit board such as the silicon substrate; yet, it is not limited to that in this embodiment.

Figure 2A:
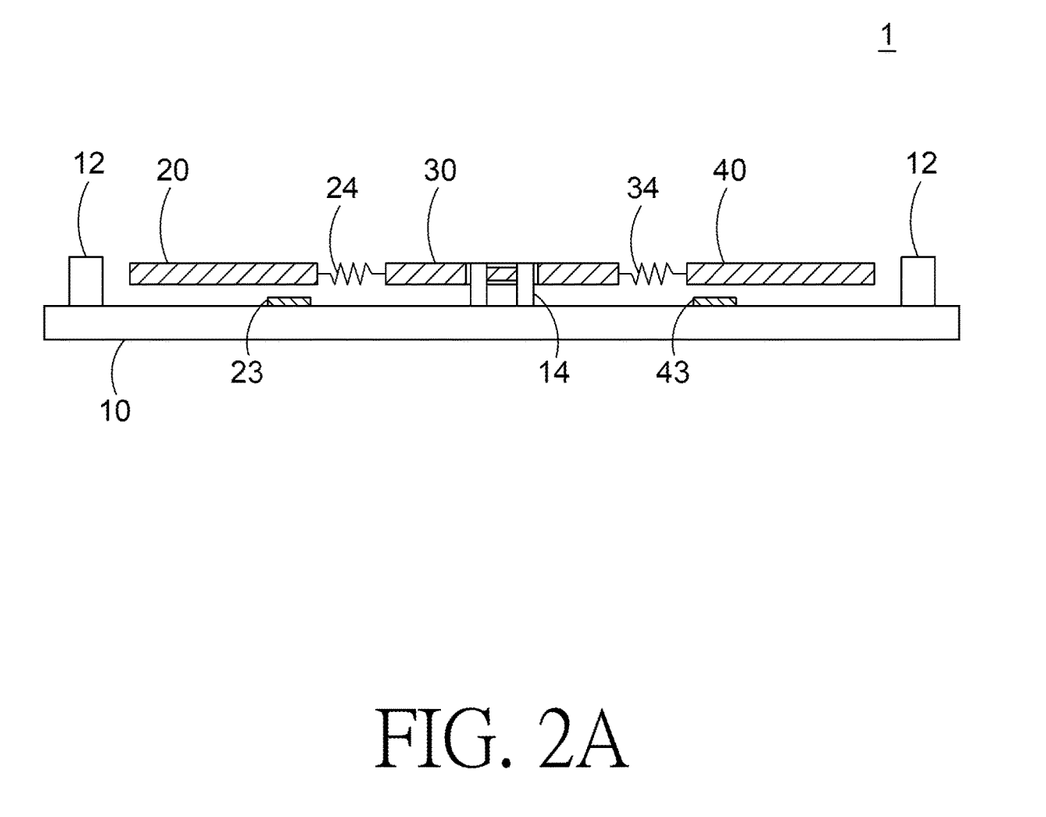
FIG. 2A to FIG. 2B: The schematic diagrams of the sectional view of structure in the first embodiment of this invention.
Figure 2B:
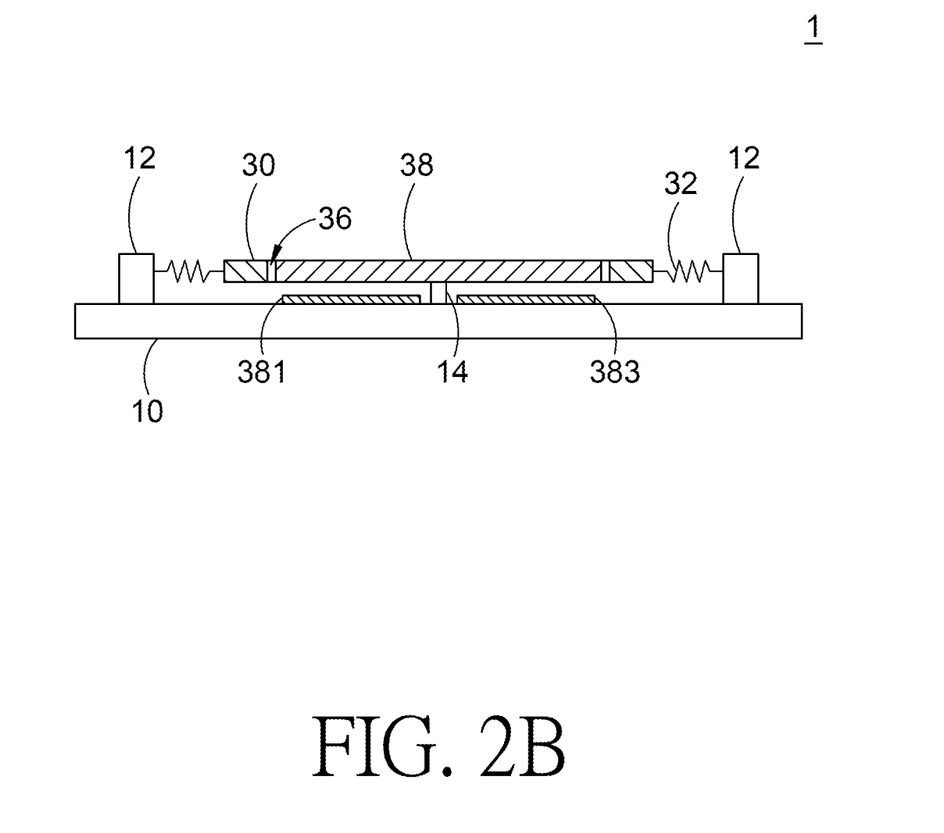

Refer to FIG. 1, FIG. 2A and FIG. 2B, wherein FIG. 2A and FIG. 2B are the schematic diagrams of the sectional view of structure in the first embodiment of this invention; FIG. 2A is sectional view AA and FIG. 2B is sectional view BB. As shown in the figures, in this embodiment, a frame 12 and a supporting column 14 are set on the substrate 10; the bottom of frame 12 touches the top surface of substrate 10. The first plate 20 has a first outer edge 21; the first outer edge 21 is connected to one end of a first flexible element 22 and one end of a second flexible element 24; the other end of the first flexible element 22 is connected to an inner edge of the frame 12, making the frame 12 able to support the first plate 20. The first plate 20 is located corresponding to a first sensing element 23 disposed on the substrate 10. The second plate 30 has a second outer edge 31, which is connected to the other end of the second flexible element 24; the second outer edge 31 of the second plate 30 is connected to one end of a third flexible element 32. The second outer edge 31 of the second plate 30 is connected to one end of a fourth flexible element 34, the other end of the third flexible element 32 is set at the inner edge of the frame 12, making the frame 12 able to support the second plate 30. a first through-hole 36 is set on the second plate 30. A rotating plate 38 is pivotally connected with both the inner edge of the first through-hole 36 and the second flexible element 24 parallelly. An inner side of the rotating plate 38 is equipped with a third through-hole 382, an inner edge of the third through-hole 382 is connected to one end of a fifth flexible element 384, the other end of the fifth flexible element 384 is connected to the supporting column 14, making the supporting column 14 and the second plate 30 support the rotating plate 38; and both the rotating plate 38 and the second plate 30 are on the same plane. the rotating plate 38 is located corresponding to a second sensing element 381 and a third sensing element 383 disposed on the substrate 10. The second sensing element 381 and the third sensing element 383 can be set symmetrically. The third plate 40 has a third outer edge 41; the third outer edge 41 is connected to the other end of the fourth flexible element 34. The third outer edge 41 is connected to one end of a sixth flexible element 42, the other end of the sixth flexible element 42 is set at the inner edge of the frame 12. The third plate 40 is located corresponding to a fourth sensing element 43 disposed on the substrate 10.

In this embodiment, the first plate 20, the second plate 30 and the rotating plate contained therein and the third plate 40 are used as the mass blocks; the motions such as the angular velocity and Coriolis force are measured by sensors.

In this embodiment, the frame 12 can be a frame-group, including a plurality of sub-frames spaced apart from each other, making the frame group form a non-continuous and non-closed structure; and the first flexible element 22, the third flexible element 22 and the sixth flexible element 42 are not limited in this embodiment.

As shown in FIG. 2A to FIG. 2B, in this embodiment, the first sensing element 23, the second sensing element 381, the third sensing element 383, and the fourth sensing element 43 can be the capacitive sensors. The first sensing element 23 senses the axial rotation of the first plate 20 corresponding to the first flexible element 22. The second sensing element 381 and the third sensing element 383 senses the axial rotation of the rotating plate 38 corresponding to the fifth flexible element 384. The fourth sensing element 43 senses the axial rotation of the third plate 40 corresponding to the sixth flexible element 42.

Figure 3A:
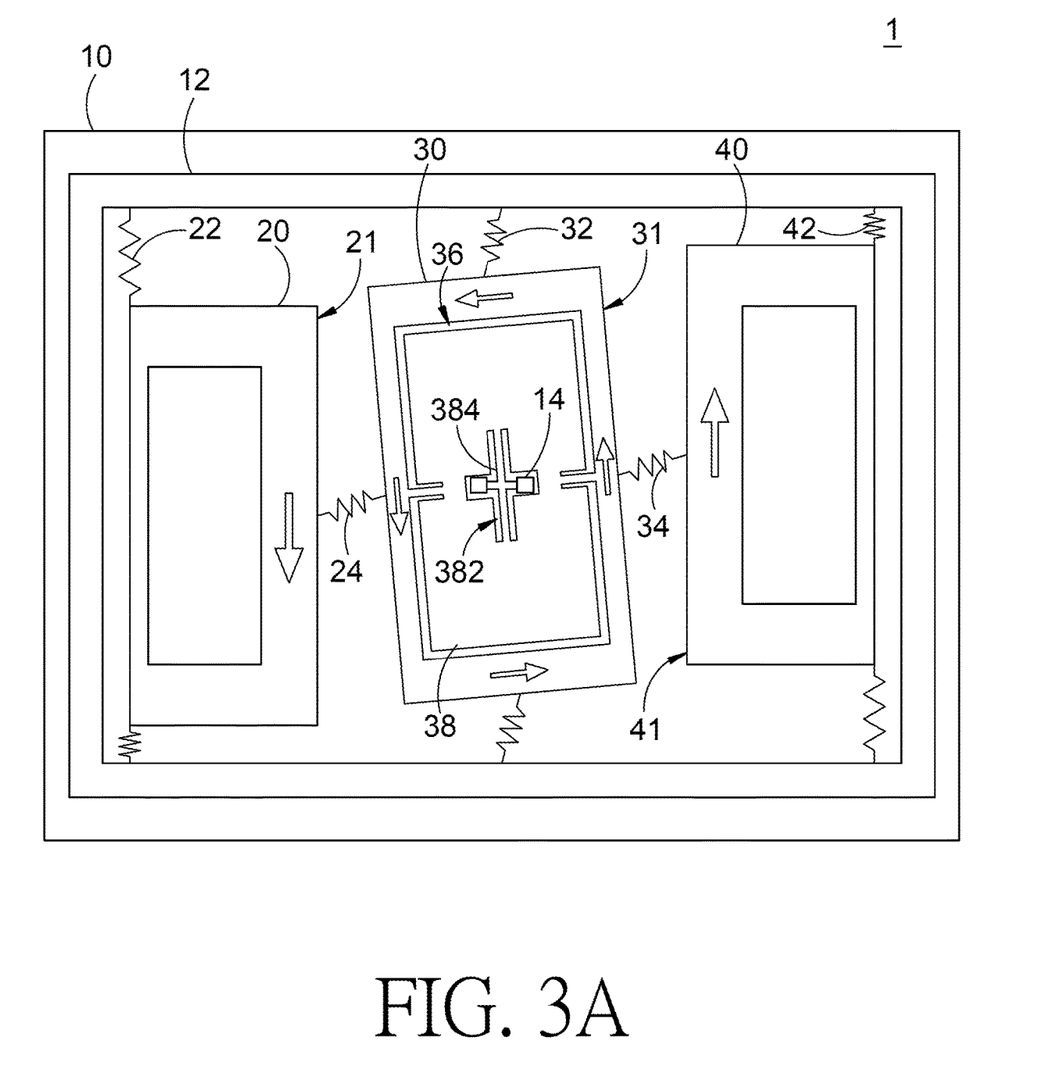
FIG. 3A to FIG. 3C: The schematic diagrams of activation in the first embodiment of this invention.
Figure 3B:
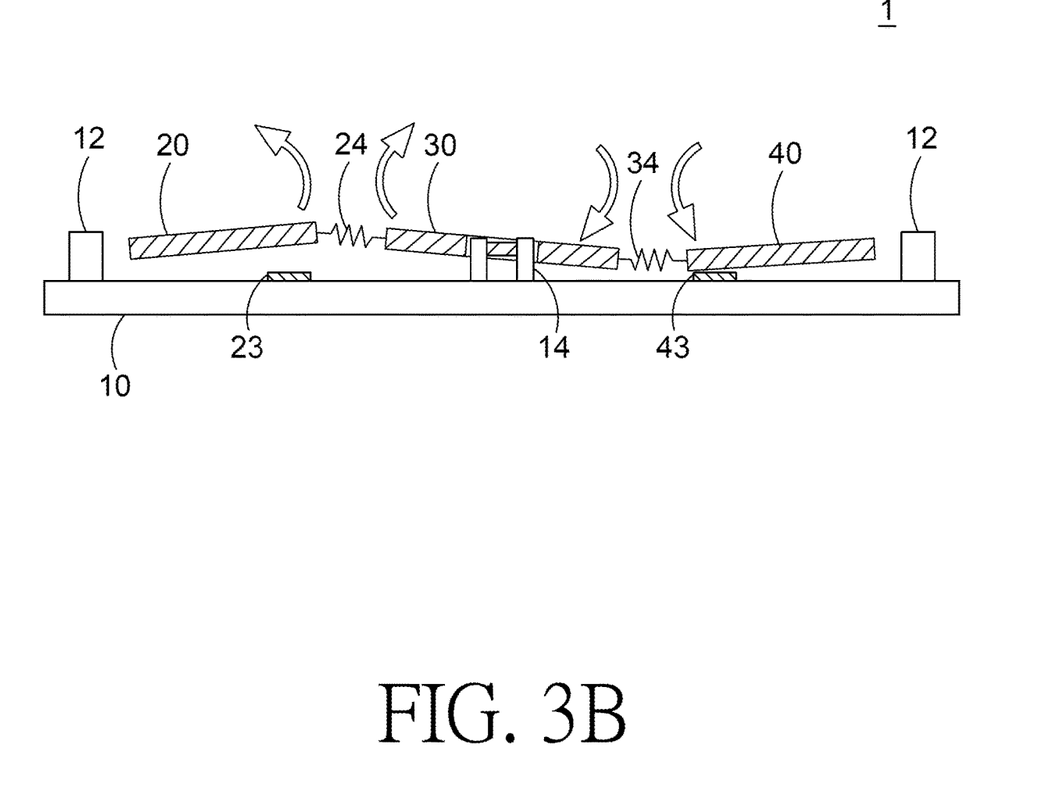
Figure 3C:
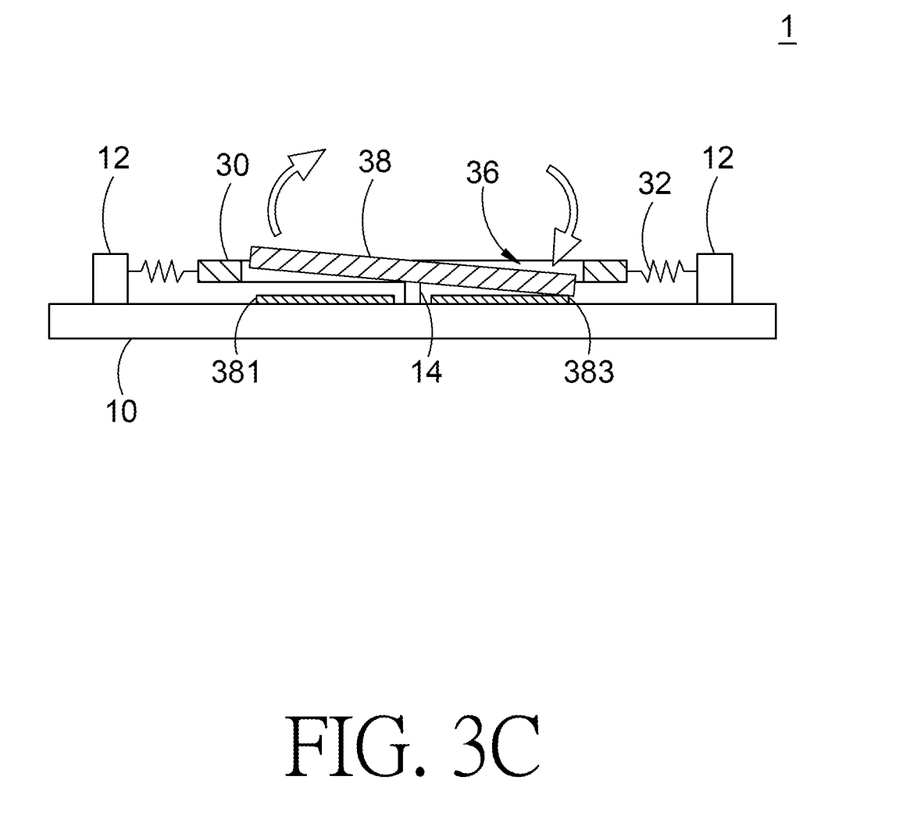

Referring to FIGS. 2A to 2B and FIGS. 3A to 3C; FIGS. 3A to 3C are the schematic diagrams of activation in the first embodiment of this invention. As shown in the figure, in this embodiment, when the structure 1 of the gyroscope vibrates horizontally, the first plate 20 moves horizontally as corresponding to the second plate 30, and the third plate 40 moves horizontally corresponding to the second plate 30 at the same time. The second flexible element 24 and the fourth flexure 34 rotate horizontally, as shown in FIG. 3A; it can rotate counterclockwise or clockwise (not shown in the figure). When the structure 1 of the gyroscope makes axial vibration corresponding to the first plate 20 and the third plate 40, the first plate 20 perform an out-of-plane axial rotation corresponding to the first flexible element 22, the second plate 30 performs an out-of-plane axial rotation corresponding to the third flexible element 32, and the third plate 40 performs an out-of-plane axial rotation corresponding to the sixth flexible element 42, like the rotating direction shown in FIG. 3B or the opposite rotating direction (not shown in the figure). When the structure 1 of the gyroscope makes axial vibration corresponding to the second flexible element 24 and the fourth flexure 34, the rotating plate 38 makes an out-of-plane axial rotation corresponding to the fifth flexible element 384, like the rotating direction shown in FIG. 3C or the opposite rotating direction (not shown in the figure). Using the motions of the first plate 20, second plate 30, third plate 40 and the rotating plate 38 to sense the direction of external vibration and its motion, such as the angular velocity.

In order for the gyroscope to sense the Coriolis force on the three axes XYZ, the mass block needs to oscillate and move in at least two different directions. In this embodiment, the first plate 20 and the third plate 40 moves or vibrate along the same axis when they vibrate, and the movement has a 180° phase difference, which makes the second plate 30 generate a rotational movement and two times of oscillation. Meanwhile, the three axial Coriolis forces of the first plate 20, the third plate 40 and the second plate 30 are detected by the first sensing element 23, the second sensing element 381, the third sensing element 383 and the fourth sensing element 43; there is 180° phase difference among each of the three Coriolis forces, with the available detecting signals generated, making this embodiment need no other mass blocks or frames; therefore, it can reduce the overall volume and occupying space of the gyroscope.

Figure 4A:
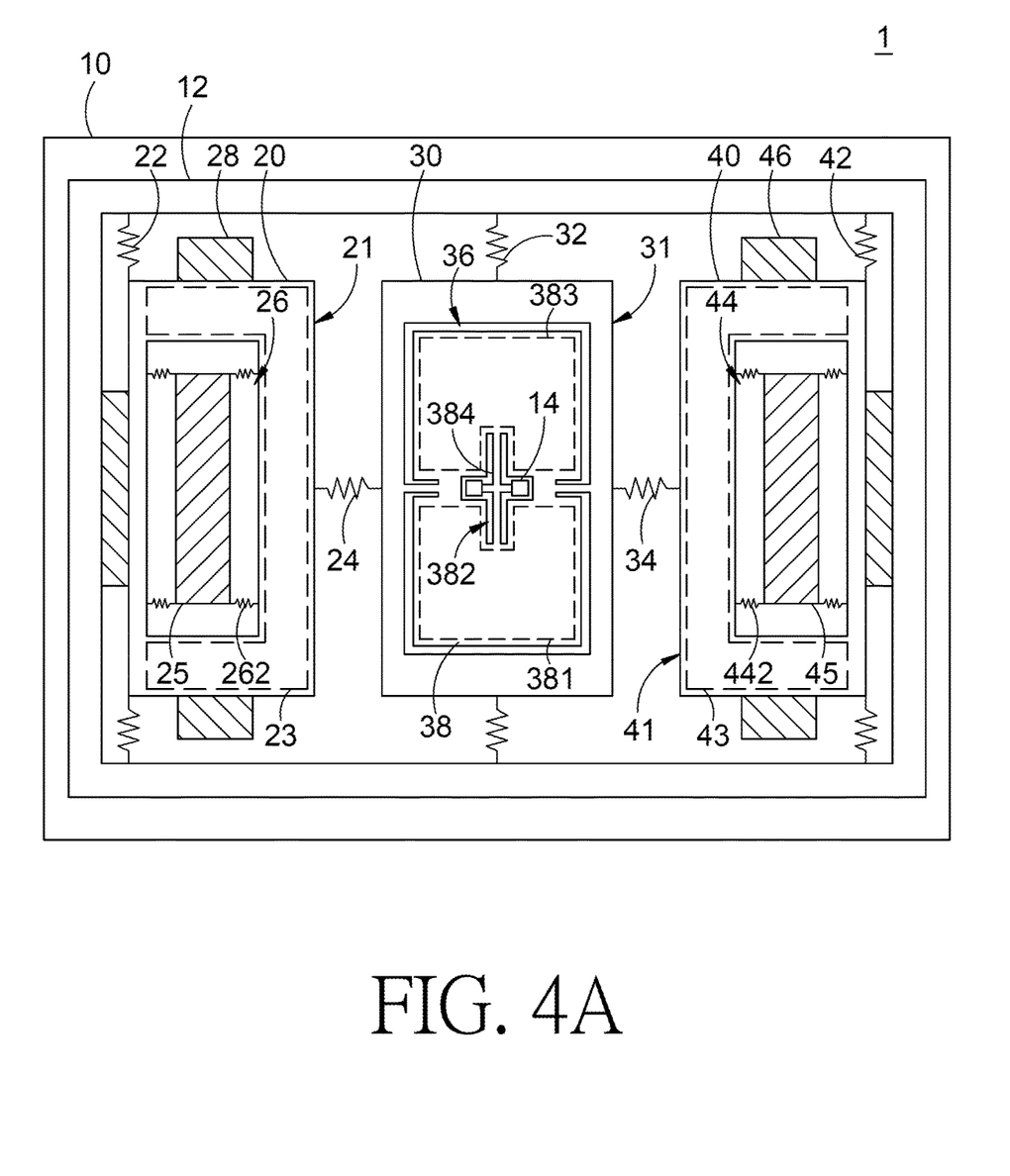
FIG. 4A to FIG. 4B: The schematic diagrams of structure and activation in the second embodiment of this invention.
Figure 4B:
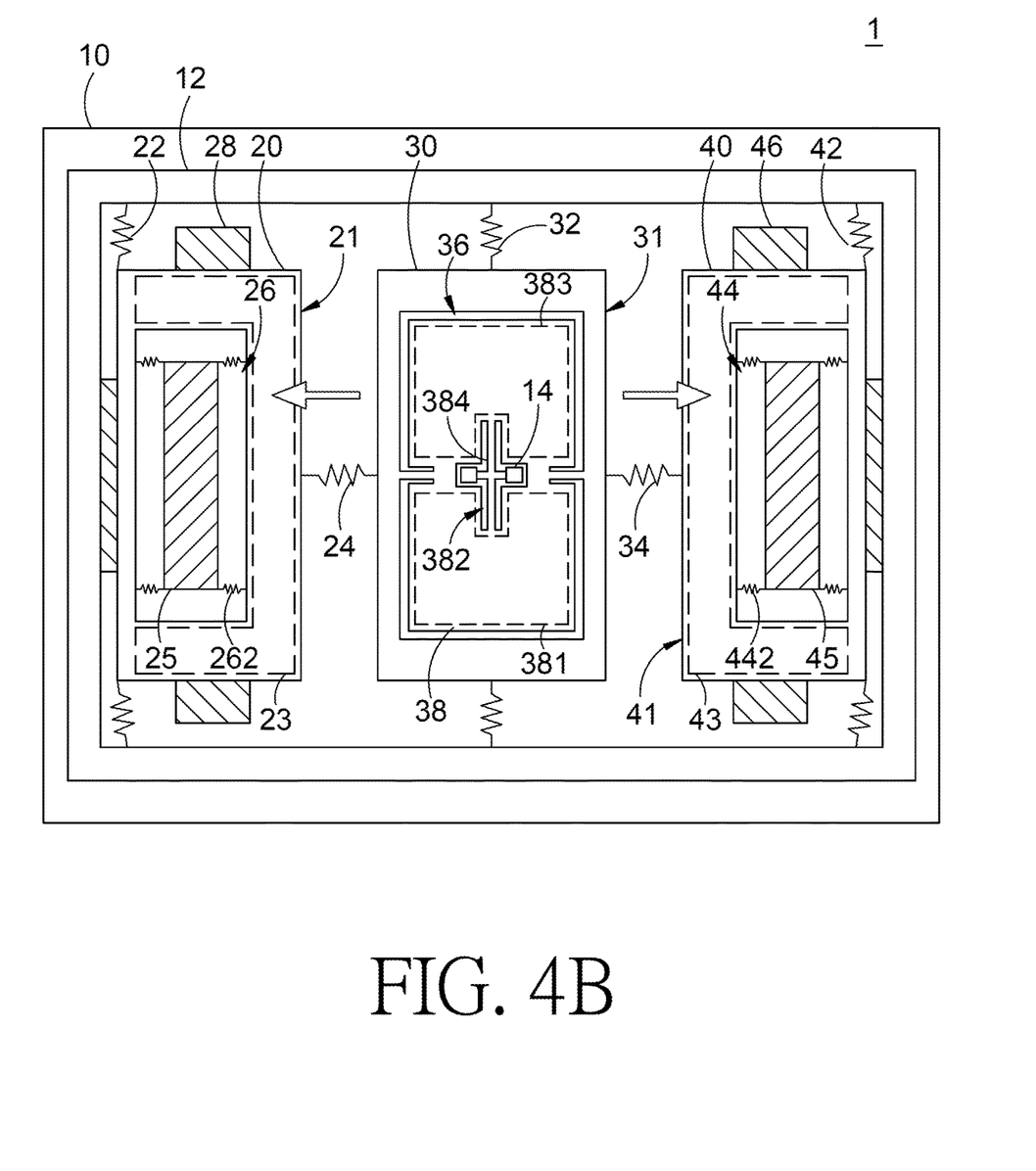

Referring to FIGS. 4A to 4B, which are the schematic diagrams of structure and activation in the second embodiment of this invention. As shown in the figures, this embodiment is based on the above first embodiment that a third through-hole 26 is set on the first plate 20 and a fourth through-hole 44 is set on the third plate 40. This embodiment further comprising a fifth sensing element 25, a first driving element 28, a seventh sensing element 45 and a third driving element 46. The fifth sensing element 25 is equipped at an inner edge of the third through-hole 26; the first driving element is equipped on the first outer edge 21 of the first plate 20; the seventh sensing element 45 is equipped at an inner edge of the fourth through-hole 44; the third driving element 46 is equipped on the third outer edge 41 of the third plate 40. The fifth sensing element can detect the horizontal movement of the first plate 20 at the inner side of the third through-hole 26 on the first plate 20, which is the movement toward the left shown in FIG. 4B, and the angular velocity and Coriolis force of the first plate 20; the seventh sensing element 45 can detect the horizontal movement of the third plate 40 at the inner side of the fourth through-hole 44 on the third plate 40, which is the movement toward right shown in FIG. 4B, and the angular velocity and Coriolis force of third plate 40. Besides, the first plate 20 also can make horizontal movement toward the right and the third plate 40 can make horizontal movement toward the left. in this embodiment, the seventh flexible element 262 is connected between the fifth sensing element 25 and the inner edge of the third through-hole 26, that is, the outer edge of the fifth sensing element is connected to one end of the seventh flexible element 262, the other side of the seventh flexible element 262 is connected to the inner edge of the third through-hole 26. In this embodiment, a ninth flexible element 442 is connected between the seventh sensing element 45 and the inner edge of the fourth through-hole 44, that is, the outer edge of the seventh sensing element 45 is connected to one end of the ninth flexible element 442, the other end of the ninth flexible element 442 is connected to the inner edge of the fourth through-hole 44.

In this embodiment, when the first plate 20 and the third plate 40 vibrate, they move and vibrate horizontally with 180° phase difference, making the second plate 30 move and can get two times of oscillation. Meanwhile, the Coriolis forces of the first plate 20 and the third plate 40 are detected by the fifth sensing element 25 and the seventh sensing element 45, with the available detecting signals generated, making this embodiment need no other mass blocks or frames; therefore, it can reduce the overall volume and occupying space of the gyroscope. The structural connections and activation of other components in this embodiment are identical to the ones in the first embodiment and won't be repeated herein.

Figure 5:
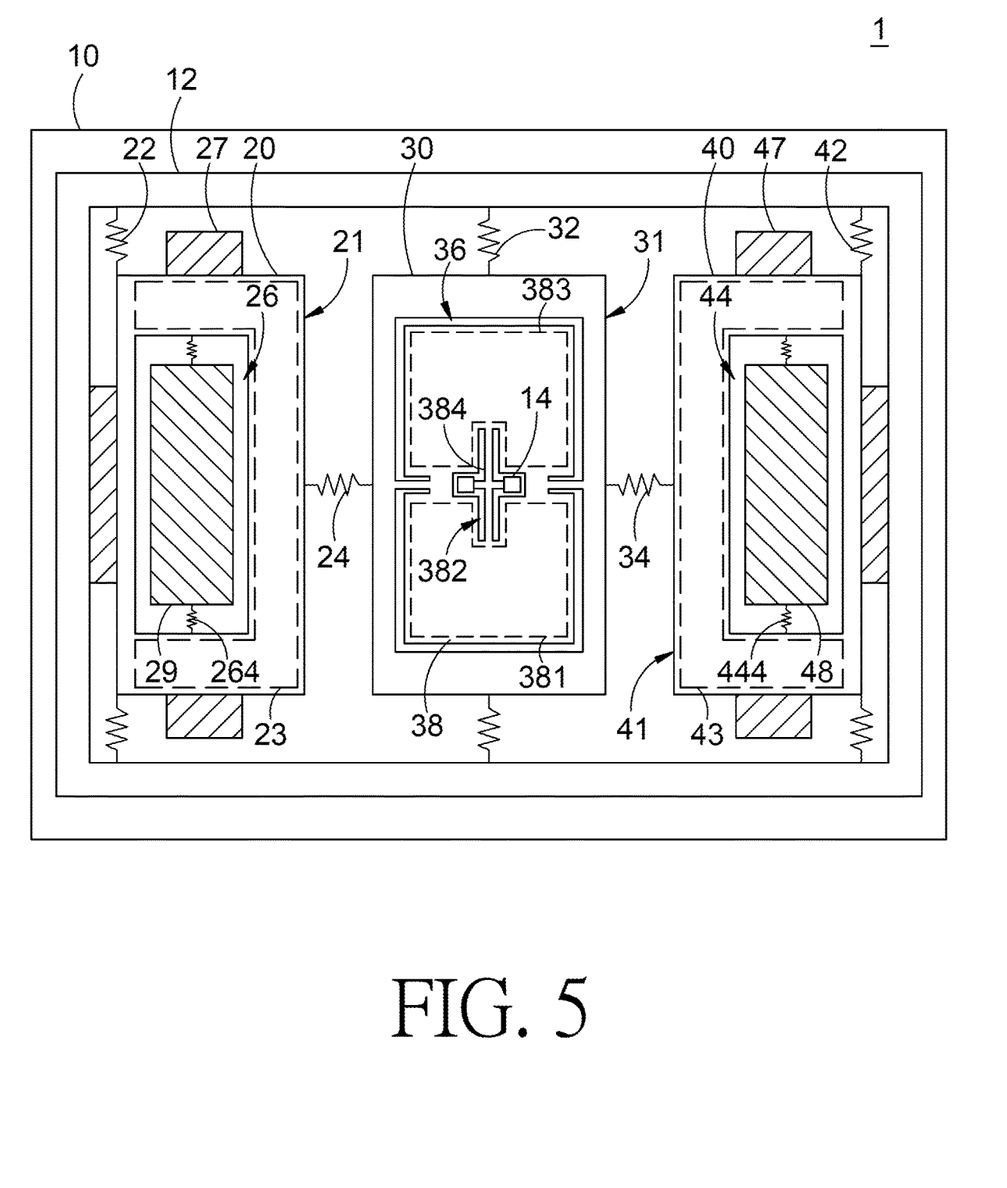
FIG. 5: The schematic diagram of structure in the third embodiment of this invention.

Referring to FIG. 5, which is the schematic diagram of structure in the third embodiment of this invention. As shown in the figure, this embodiment is based on the above first embodiment that a third through-hole 26 is set on the first plate 20 and a fourth through-hole 44 is set on the third plate 40. This embodiment further comprising a sixth sensing element 27, a second driving element 29, an eighth sensing element 47 and a fourth driving element 48. The sixth sensing element 27 can detect the angular velocity and Coriolis force of the first plate 20 at the first outer edge 21 of the first plate 20; The eighth sensing element 47 can detect the angular velocity and Coriolis force of the first plate 40 at the third outer edge 41 of the third plate 40. In this embodiment, the eighth flexible element 264 is connected between the second driving element 29 and the third through-hole 26, that is, the outer edge of the second driving element 29 is connected to one end of the eighth flexible element 264, the other end of the flexible element is connected to the inner edge of the third through-hole 26. In this embodiment, the tenth flexible element 444 is connected between the fourth driving element 48 and the fourth through-hole 44, that is, the outer edge of the fourth driving element 48 is connected to one end of the tenth flexible element 444, the other end of the flexible element 444 is connected to the inner edge of the fourth through-hole 44.

In this embodiment, when the first plate 20 and the third plate 40 vibrate, they move and vibrate horizontally with 180° phase difference, making the second plate 30 move and can get two times of oscillation. Meanwhile, the Coriolis forces of the first plate 20 and the third plate 40 are detected by the fifth sensing element 25 and the seventh sensing element 45, with the available detecting signals generated, making this embodiment need no other mass blocks or frames; therefore, it can reduce the overall volume and occupying space of the gyroscope. The structural connections and activation of other components in this embodiment are identical to the ones in the first embodiment and won't be repeated herein.

Figure 6:
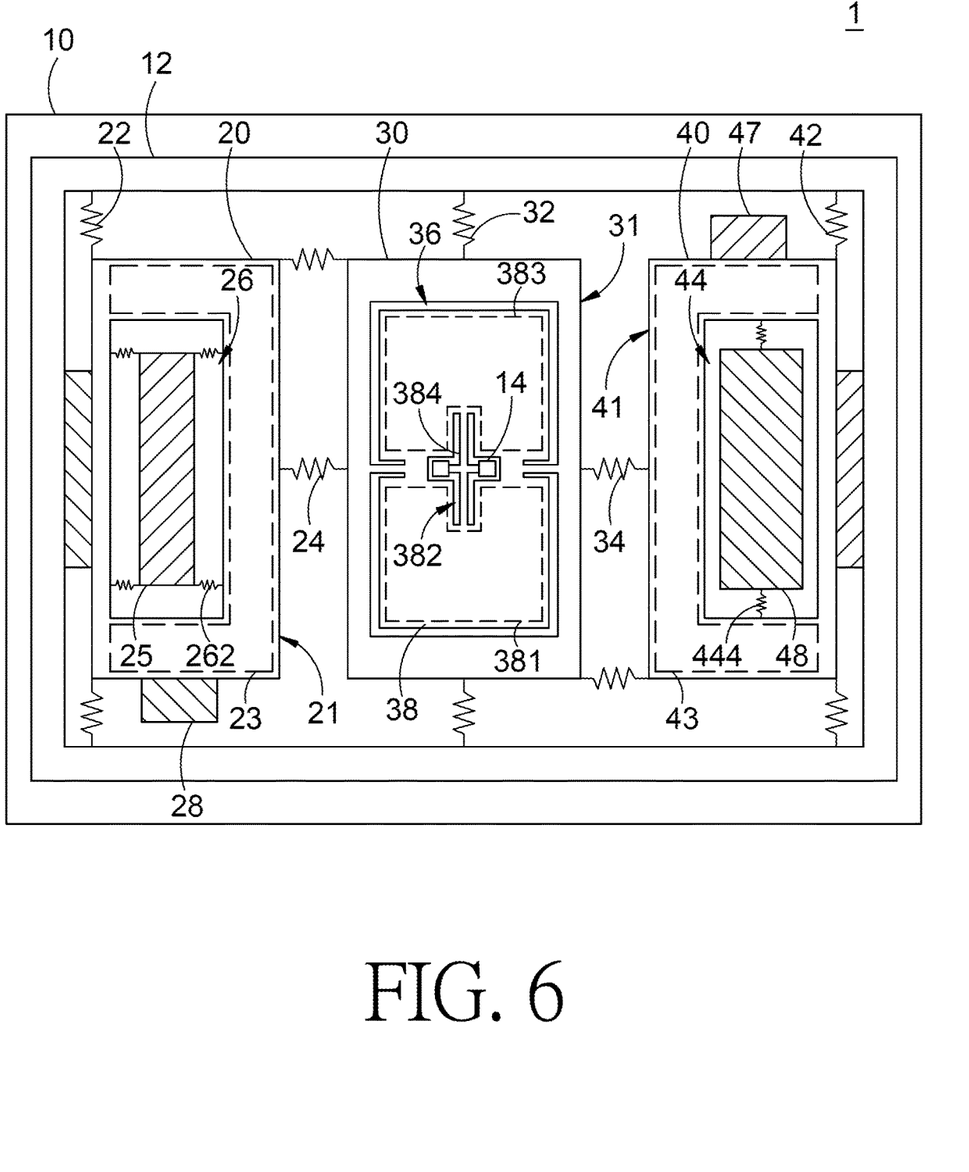
FIG. 6: The schematic diagram of structure in the fourth embodiment of this invention.

Referring to FIG. 6, which is the schematic diagram of structure in the fourth embodiment of this invention. As shown in the figure, this embodiment is based on the above second and third embodiments. In this embodiment, the sensing elements and driving elements of this embodiment are arranged asymmetrically. As shown in FIG. 6, the fifth sensing element 25 is equipped at the inner edge of the third through-hole 26 on the first plate 20, and the fourth driving element 48 is equipped at the inner edge of the fourth through-hole 44 on the third plate 40, which is different from the above second and third embodiments; and the flexible member which is connected between the first plate 20 and the second plate 30 and the flexible element connected to the second plate 20 and the third plate 40 are asymmetrically allocated in this embodiment. Using the asymmetrical flexible elements, sensing elements and driving elements to meet the requirements of different designs.

Continue to above, in the second and third embodiments, the fifth sensing element 25, sixth sensing element 27, seventh sensing element 45 and eighth sensing element 47 can use the capacitive sensing elements.

Figure 7:
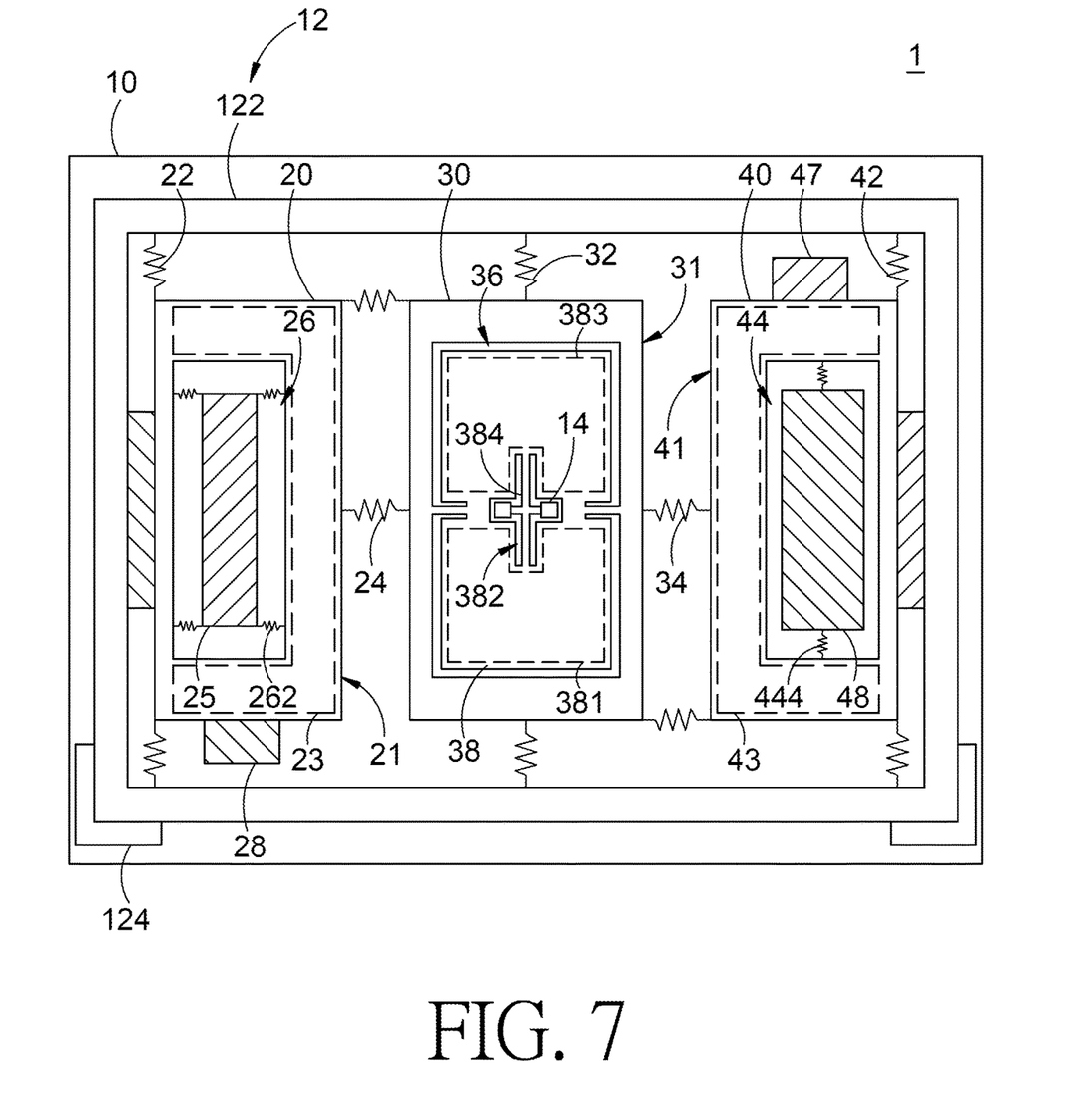
FIG. 7: The schematic diagram of structure in the fifth embodiment of this invention.

Referring to FIG. 7, which is the schematic diagram of structure in the fifth embodiment of this invention. As shown in the figure, this embodiment is based on the above first, second, third and fourth embodiments. In this embodiment, the frame 12 disposed on the substrate 10 comprising a body 122 and a supporting frame 124; the body 122 is disposed at one end of the supporting frame 124, an inner edge of the body 122 is equipped with the first flexible element 22, the third flexible element 32 and the sixth flexible element 42; the other end of the supporting frame 124 is disposed on the substrate 10 to support the body 122. In this embodiment, there is the spacing between the body 122 and the substrate 10 that makes the body 122 and its connecting device suspended on the substrate 10.

Figure 8:
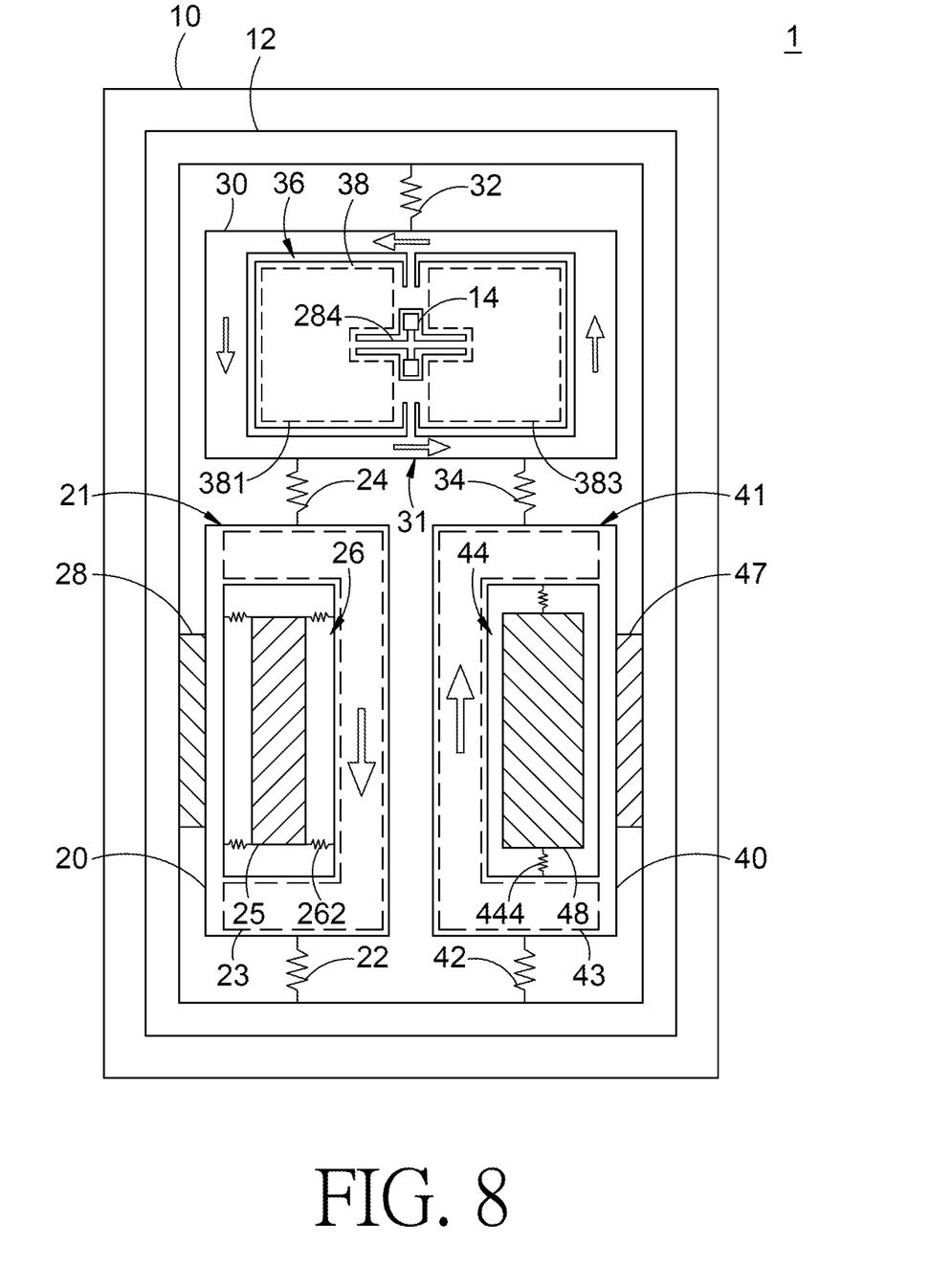
FIG. 8: The schematic diagram of structure in the sixth embodiment of this invention.

Referring to FIG. 8, which is the schematic diagram of structure in the sixth embodiment of this invention. As shown in the figure, this embodiment is based on the above first, second, third and fourth embodiments. The first plate 20 and the third plate 40 in the first, second, third and fourth embodiment shall be disposed on the opposite side of the second plate 30; in this embodiment, the first plate 20 and the third plate 40 are disposed in the same side of the second plate 30; when the first plate 20 and the third plate 40 perform a horizontal movement with 180° phase difference, they make the second plate 30 move with two times of oscillation to obtain the effort specified in the first, second and third embodiments. In this embodiment, the sensing element and the driving element also can be set asymmetrically to obtain the effort specified in the fourth embodiment.

In summary, this invention discloses a gyroscope structure, which uses two plates to move or vibrate along the same axis; the movement has a 180° phase difference, making the other plate rotates to obtain two times of oscillation with a 180° phase difference. Meanwhile, the Coriolis force and angular velocity of the plate are detected by the sensing element with a sensing signal generated, and the sensed data has a 180° phase difference. With this structure, this invention can obtain the sensing requirements of the gyroscope with three main mass blocks, which has reduced the overall volume and occupying space of the gyroscope and solve the problem of excessive volume that requires external costs in the conventional gyroscope technology.

Therefore, this invention is innovative, progressive, and available for industrial use. It should undoubtedly meet the patent application requirements of the ROC Patent Act. We hereby file the patent application in this invention according to the law and anticipate the Authority's patent grant.

However, the above are only preferred embodiments of this invention and are not used to limit the scope of implementation of this invention. For example, all shapes, structures, features, and spirits described in the scope of the patent application of this invention are equal changes and modifications shall be included in the scope of the patent application of this invention.

The invention claimed is:

1. A gyroscope structure, features comprising:
a substrate, with a frame disposed on the substrate;
a first plate, with a first outer edge connected to one end of a first flexible element and one end of a second flexible element, the other end of the first flexible element disposed at an inner edge of the frame, wherein the first plate is corresponding to a first sensing element disposed on the substrate, the both ends of the first flexible member are respectively located at both sides of the first flexible member;
a second plate, with a second outer edge connected to the other end of the second flexible element; the second outer edge of the second plate connected to one end of a third flexible element and a fourth flexible element, the other end of the third flexible element disposed at the inner edge of the frame; a first through-hole set in the second plate; an inner edge of the first through-hole parallelly pivoted to a rotating plate; a third through-hole set in an inner side of the rotating plate, an inner edge of the third through-hole connected to one end of the fifth flexible element, the other end of the fifth flexible element connected to a supporting column disposed on the substrate; wherein the rotating plate is corresponding to a second sensing element and a third sensing element disposed on the substrate, the both ends of the second flexible member are respectively located at both sides of the second flexible member, the both ends of the third flexible member are respectively located at both sides of the third flexible member, the both ends of the fifth flexible member are respectively located at both sides of the fifth flexible member; and
a third plate, with a third outer edge connected to the other end of the fourth flexible element and one end of a sixth flexible element, the other end of the sixth flexible element set at the inner edge of the frame; wherein the third plate is corresponding to a fourth sensing element disposed on the substrate, the both ends of the fourth flexible member are respectively located at both sides of the fourth flexible member, the both ends of the sixth flexible member are respectively located at both sides of the sixth flexible member.

2. The gyroscope structure of claim 1, wherein the third through-hole set on the first plate.

3. The gyroscope structure of claim 2, further comprising a fifth sensing element and a first driving element; the fifth sensing element disposed at an inner edge of the third through-hole, the first driving element disposed at the first outer edge of the first plate.

4. The gyroscope structure of claim 3, further comprising a seventh flexible element disposed between the fifth sensing element and the inner edge of the third through-hole.

5. The gyroscope structure of claim 3, further comprising a ninth flexible element disposed between the seventh sensing element and a fourth through-hole.

6. The gyroscope structure of claim 2, further comprising an eighth sensing element and a fourth driving element; the ninth sensing element disposed at the third outer edge of the third plate, the fourth driving element disposed at an inner edge of a fourth through-hole.

7. The gyroscope structure of claim 1, further comprising a sixth sensing element and a second driving element; the sixth sensing element disposed at the first outer edge of the first plate, the second driving element disposed at an inner edge of the third through-hole.

8. The gyroscope structure of claim 7, further comprising an eighth flexible element disposed between the second driving element and the inner edge of the third through-hole.

9. The gyroscope structure of claim 7, further comprising a tenth flexible element disposed between the fourth driving element and the inner edge of a fourth through-hole.

10. The gyroscope structure of claim 1, wherein the third plate set in a fourth through-hole.

11. The gyroscope structure of claim 10, further comprising a seventh sensing element and a third driving element; the seventh sensing element disposed at an inner edge of the fourth through-hole, the third driving element disposed at the third outer edge of the third plate.

12. The gyroscope structure of claim 1, wherein the frame comprising a body and a supporting frame; the body at one end of the supporting frame, the first flexible element set on an inner edge of the body, the third flexible element and the sixth flexible element; the other end of the supporting frame disposed on the substrate, the both end of the supporting frame are located at both sides of the supporting frame.

13. The gyroscope structure of claim 1, wherein the first plate moving horizontally as corresponding to the second plate, the first plate performing an axial rotation corresponding to the first flexible element, the second plate performing an axial rotation corresponding to the second flexible element and the fourth flexible element, the second plate performing an axial rotation corresponding to the third flexible element, the rotating plate performing an axial rotation corresponding to the fifth flexible element, the third plate moving horizontally as corresponding to the second plate, and the third plate performing an axial rotation corresponding to the sixth flexible element.

14. The gyroscope structure of claim 1, wherein the frame comprising a plurality of sub-frames, the sub-frames are set apart from each other.

* * * * *